Feb. 1, 1966  J. C. WHITESIDES  3,232,356
ROTARY HOE

Filed Feb. 26, 1964  3 Sheets-Sheet 1

INVENTOR.
JACK C. WHITESIDES
BY
Newton, Hopkins & Jones
ATTORNEYS

INVENTOR.
JACK C. WHITESIDES
BY
Newton, Hopkins & Jones
ATTORNEYS

United States Patent Office 3,232,356
Patented Feb. 1, 1966

3,232,356
ROTARY HOE
Jack C. Whitesides, Albany, Ga., assignor to Lilliston Implement Company, Albany, Ga., a corporation of Georgia
Filed Feb. 26, 1964, Ser. No. 347,583
5 Claims. (Cl. 172—548)

This invention relates to farming implements and more particularly to a rotary hoe for use on a rotary cultivator.

Rotary cultivators are well-known and customarily employ a plurality of rotary hoes assembled into gangs to perform a variety of cultivating operations. The gangs of rotary hoes are arranged on a rotary cultivator in accordance with the particular cultivating operation to be performed by the rotary cultivator.

Previous rotary hoes used alone or in gangs arranged on a rotary cultivator have generally had a plurality of tines extending substantially radially from a central hub. Usually the cutting edge of each tine of previous rotary hoes is at the outermost tip of the tine and approximately parallel to the axis of rotation of the central hub from which the tine extends. Moreover, the working or soil moving surface of each tine has generally also been parallel to the axis of rotation of the central hub from which the tine extends.

This tine construction generally used with previous rotary hoes has resulted in each tine working only a small portion of the soil over which the rotary hoe is moving. As a result, when previous rotary hoes are positioned in planes of rotation parallel to their direction of linear motion, strips of unworked soil are generally left between adjacent rotary hoes. These strips of unworked soil can be avoided with previous rotary hoes only by using closely spaced rotary hoes or by positioning relatively widely spaced rotary hoes in planes of rotation at an angle to their direction of linear motion so that the soil engaged by the tines of one rotary hoe overlaps the soil engaged by the tines of an adjacent rotary hoe.

The use of closely spaced rotary hoes in planes of rotation parallel to their direction of linear motion is undesirable from the cost standpoint because it increases the number of rotary hoes required to work a given area of soil. Although the use of relatively widely spaced rotary hoes in planes of rotation at an angle to their direction of linear motion is acceptable from a cost standpoint, the tine construction customarily used with previous rotary hoes results in substantial power being required simply to force the sides of the tines into the soil. This is power which is not available for the actual cultivation of the soil and which frequently makes it necessary to use a larger and more expensive tractor or other means for moving the rotary hoes than is desirable from an efficiency standpoint.

The rotary hoes disclosed herein substantially eliminates these and other problems with previous rotary hoes. This is because when a plurality of the rotary hoes disclosed herein are assembled in a gang, the rotary hoes will completely work a ribbon of soil without leaving unworked strips of soil between adjacent rotary hoes and without substantial power being required simply to force the tines into the soil as with previous rotary hoes. Thus, the soil is cultivated with substantially all of the power of the tractor or other means used to move the rotary hoes being employed in the actual cultivation of the soil.

In addition, the rotary hoe disclosed herein pierces the soil and efficiently works the soil while in a plane of rotation at an angle to its direction of linear motion and with each tine engaging a relatively large amount of soil each time it pierces the soil. Thus, only a relatively few of the rotary hoes disclosed herein are required to completely work a ribbon of soil having substantial width transverse to the direction of linear motion of the rotary hoes. Moreover, in addition to efficiently working a relatively wide ribbon of soil, the rotary hoe disclosed herein works the soil in the ribbon in a manner superior to previous rotary hoes.

These improvements in rotary hoes are provided by a rotary hoe having a plurality of arcuate tines extending outwardly from a central hub. Each of the tines of the rotary hoe disclosed herein resembles an elongated wedge bent into an arcuate shape so as to form an arcuate cutting edge extending along each tine from adjacent the central hub to the outer end of the tine. The cutting edges of the plurality of tines are in a plane of reference perpendicular to the axis of rotation of the hub and define the working side of the rotary hoe disclosed herein. The working surface of each of the plurality of tines of the rotary hoe disclosed herein is a surface which extends from the cutting edge of each tine toward the other or non-working side of the rotary hoe and inwardly toward the central hub.

The result of the tine construction described above is that when the rotary hoe disclosed herein is positioned with its working side at an angle to its direction of linear motion and so that it is the working side of the rotary hoe which engages the soil as the rotary hoe is moved, the cutting edge of each tine pierces the soil along that portion of its length which the vertical position of the rotary hoe forces into the soil and the working surface of the tine forces the soil upward and laterally. Thus, the tine construction of the rotary hoe disclosed herein results in each tine sliding easily into the soil and in a relatively large area of soil being forced upward and laterally not only by the rotation of the rotary hoe but also by the shape of the tine.

As a tine carries soil upward with rotation of the rotary hoe, the soil is dropped from the tine adjacent to the rotary hoe after that motion of the soil transverse to the direction of linear motion of the rotary hoe resulting from the component of tine rotational motion transverse to the direction of linear motion of the rotary hoe. Thus, the tine construction of the rotary hoe disclosed herein provides a rotary hoe which efficiently works the soil over which the rotary hoe is moved, which does not require substantial power to force a tine into the soil, and which avoids other disadvantages associated with previous rotary hoes.

These and other features and advantages of the invention will be more clearly understood from the following detailed description and the accompanying drawings in which like characters of reference designate corresponding parts throughout the figures and in which.

Figure 1:
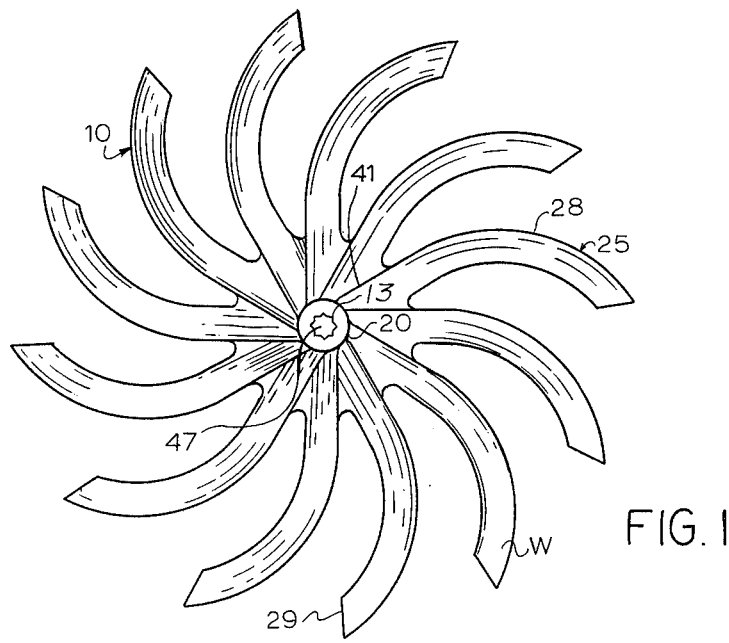
FIG. 1 is a side elevational view of an embodiment of the rotary hoe disclosed herein as seen from its working side.

These figures and the following detailed description disclose a specific embodiment of the invention but the invention is not limited to the details disclosed since it may be embodied in other equivalent forms.

The rotary hoe 10 disclosed herein is best understood as comprising a central hub 20 from which a plurality of tines 25 extend outwardly. The tines 25 are uniformly distributed around the circumference of the central hub 20 and extend outwardly in a plane of reference substantially perpendicular to the axis of rotation of the central hub 20. The plurality of tines 25 are identical to each other and each of the plurality of tines 25 is shaped to provide an arcuate cutting edge 28 along one side of each tine 25, an arcuate trailing edge 33 along the opposite side of the tine 25 from the cutting edge 28, and a working surface 30 between the cutting edge 28 and the trailing edge 33 which curves inwardly from the cutting edge 28 toward the central hub 20. It is the cutting edge 28 of each tine 25 which cuts easily into the soil along a portion of its length and it is the working surface 30 of each tine 25 and the movement of tine 25 with rotation of the rotary hoe 10 which raise and thoroughly turn and agitate the soil.

Figure 2:
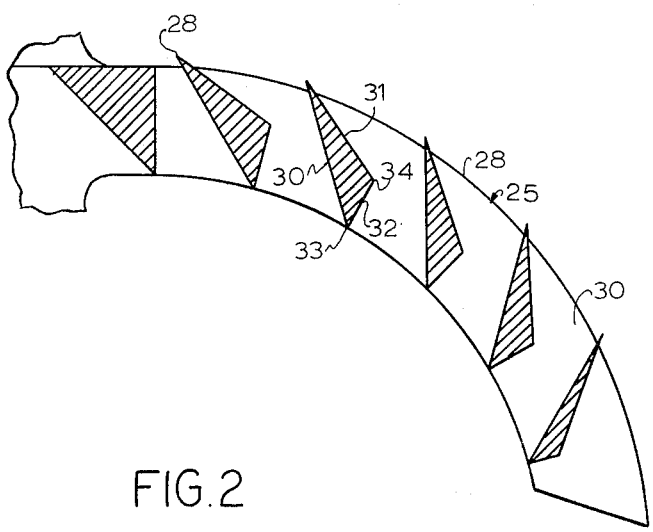
FIG. 2 is an enlarged detail view of one of the plurality of tines of the embodiment of the rotary hoe shown in FIG. 1 and in which the shape of the tine along its length is shown by a plurality of cross sections rotated ninety degrees about extended radii of curvature of the trailing edge of the tine.

The specific embodiment of the rotary hoe 10 shown in FIGURES 1 and 2 clearly illustrates a tine 25 construction which provides this cutting edge 28 and working surface 30. In this embodiment of the rotary hoe 10, each of the plurality of tines 25 has the arcuate cutting edge 28 extending from the central hub 20 to the outer end 29 of the tine 25. The arcuate cutting edge 28 of each of the plurality of tines 25 has a constant radius of curvature as it extends from an initial straight segment 41 adjacent the central hub 20 and each cutting edge 28 is formed by the intersection of the working surface 30 and a second surface 31 which together define an acute angle at the arcuate cutting edge 28 so as to provide the tine 25 with a wedge-shaped appearance.

Figure 6:
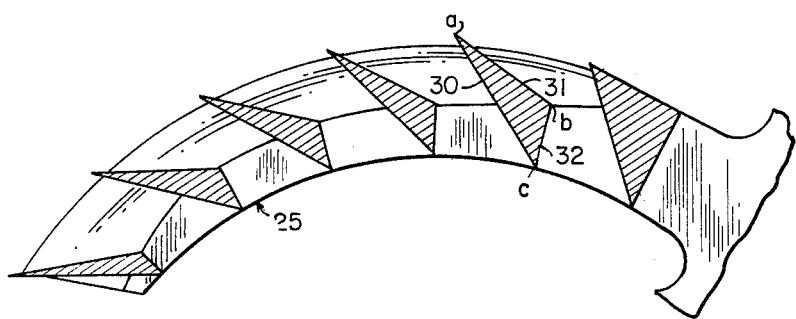
FIG. 6 is a view of a single tine showing the side opposite that shown in FIG. 1, and in which the shape of the tine along its length is shown by a plurality of cross sections.
Figure 5:
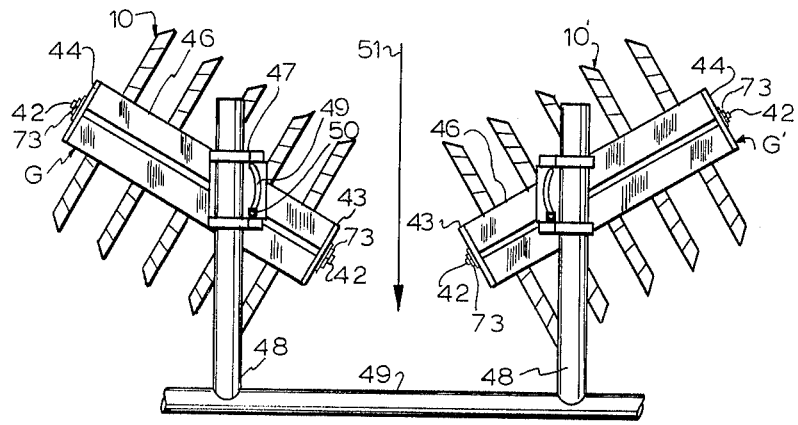
FIG. 5 is a top plan view of the rotary hoe gang shown in FIG. 4 and of a rotary hoe gang formed by a plurality of rotary hoes having their tines arranged in accordance with the second embodiment of the rotary hoe shown in FIG. 3.
Figure 4:
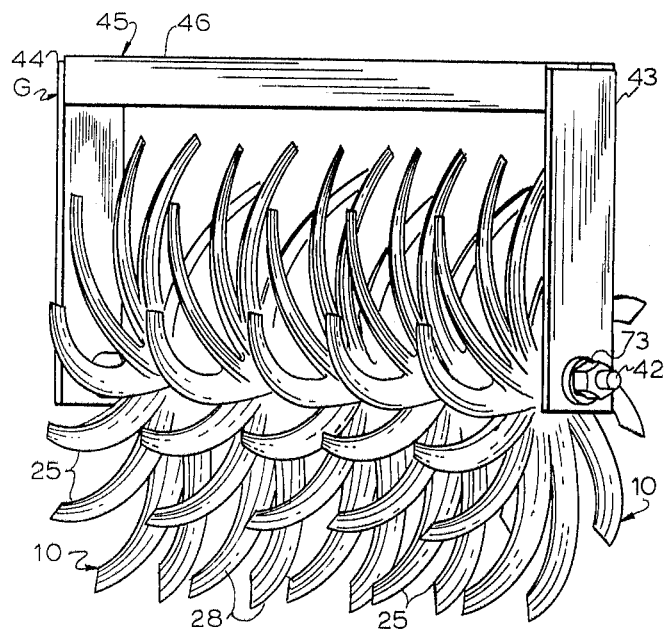
FIG. 4 is a perspective view of a rotary hoe gang formed by a plurality of rotary hoes having their tines arranged in accordance with the first embodiment of the rotary hoe shown in FIG. 1.

FIG. 6 graphically illustrates the working surface a–c, the second surface a–b, and a third surface b–c.

The third surface 32 of each of the plurality of wedge-shaped tines 25 extends between the trailing edge 33 of the working surface 30 and that edge 34 of the second surface 31 most remote from the cutting edge 28. The third surface 32, the trailing edge 33, and the edge 34 of the second surface 31 of each tine 25 are in a plane of reference substantially perpendicular to the axis of rotation of the central hub 20 and displaced along the axis of rotation of the central hub 20 from a similar plane of reference containing the cutting edge 28 of the tine 25.

The trailing edge 33 of each tine 25 has an arcuate shape with a constant radius of curvature and its center of curvature in the same line of reference parallel to the axis of rotation of the central hub 20 as the center of curvature of the cutting edge 28 of the tine 25. However, the radius of curvature of the trailing edge 33 of each tine 25 is shorter than the radius of curvature of the cutting edge 28 of the tine 25. As a result, the working surface 30 of each of the plurality of tines 25 extends from the cutting edge 28 to the trailing edge 33 both in a direction parallel to the axis of rotation of the central hub 20 and in a direction toward the line of reference containing the centers of curvature of the cutting edge 28 and the trailing edge 33. It will be understood that this positioning of the cutting edge 28 and the trailing edge 33 causes the working surface 30 to form a constant angle at all points along the length of the tine 25 with a plane of reference containing the cutting edge 28 and perpendicular to the axis of rotation of the central hub 20. The angle formed in the embodiment shown in FIGURES 1 and 2 is approximately forty-five degrees.

In the specific embodiment of the invention shown in FIG. 1, the edge 34 has an arcuate shape with a plurality of centers of curvature and a plurality of radii. The centers of curvature and radii are selected so that the distance between the trailing edge 33 and the edge 34 of each tine 25 is least at the outer end 29 of the tine 25 and increases along the length of the tine 25 until it reaches a maximum adjacent to the central hub 20. This is most clearly shown in FIG. 2 and it will be seen from FIG. 2 that the shape of the edge 34 results in each tine 25 being relatively thin at its outer end 29 and increasing in thickness to a maximum thickness adjacent the central hub 20. This increase in the thickness of each tine 25 from its outer end 29 toward the central hub 20 permits each tine 25 to be relatively thin at and adjacent to its outer end 29 while at the same time having sufficient thickness and strength to prevent the tine 25 from breaking when the tine 25 strikes rocks, stones and other hard objects.

The tines 25 of the rotary hoe disclosed herein all extend from the central hub 20 in the identical manner and as a result all of the cutting edges 28 of the plurality of tines 25 are in a first plane of reference perpendicular to the axis of rotation of the central hub 20 and all of the trailing edges 33 of the plurality of tines 25 are in a second plane of reference displaced along the axis of rotation of the central hub 20 from the first plane of reference. When the operation of the rotary hoe disclosed herein is explained below, it will be understood that the cutting edges 28 of the plurality of tines 25 define the working side W of the rotary hoe and that the trailing edges 33 of the rotary hoe define the non-working side N of the rotary hoe.

*Operation*

The rotary hoe 10 disclosed herein is used to cultivate soil by moving the rotary hoe 10 in a direction of linear motion with the rotary hoe 10 positioned so that the working side W of the rotary hoe forms an acute angle with a line of reference parallel to the direction of linear motion of the rotary hoe 10 and is the side of the rotary hoe 10 which initially engages the soil to be cultivated. It will be understood that when the rotary hoe 10 engages the soil to be cultivated in this position, the cutting edges 28 of the tines 25 are forced into the soil by the linear motion of the rotary hoe 10.

As the cutting edge 28 of each tine 25 of the rotary hoe 10 disclosed herein cuts into the soil with linear motion of the rotary hoe 10, the soil moves across the working surface 30 of the tine 25. The resistance to the soil to cutting by the cutting edge 28 of each of the plurality of tines 25 and to motion across the working surface 30 of the tine 25 tends to retard linear motion of the tine 25 so that the tine 25 rotates about the axis of rotation of the central hub 20 with continuing linear motion of the rotary hoe 10 as a whole. This serves to cause another tine 25 of the rotary hoe 10 to rotate downwardly and to engage the soil with its cutting edge 28. Thus, it will be understood that the rotary hoe 10 rotates about the axis of rotation of the central hub 20 as it is moved in a direction of linear motion with the tines 25 engaging the soil to be cultivated.

It will also be understood that the direction of rotation of the rotary hoe 10 about the axis of rotation of the central hub 20 causes each tine 25 to enter the soil being cultivated in front of the central hub 20 and to be withdrawn from the soil being cultivated behind the central hub 20 as the rotary hoe 10 is moved in a direction of linear motion. This direction of rotation of the rotary hoe 10 about the axis of rotation of the central hub 20 corresponds to counter-clockwise rotation of the rotary hoe 10 as viewed in FIG. 1 and from FIG. 1 the action of each tine 25 of the rotary hoe 10 with respect to the soil being cultivated by the rotary hoe 10 becomes apparent.

From FIG. 1, it will be seen that each tine 25 of the rotary hoe 10 initially engages the soil with the tine 25 extending in a direction opposite to the direction of rotation of the rotary hoe 10 and with the soil generally tangent to the arcuate cutting edge 28 of the tine 25. This positioning of the tine 25 causes the soil to be initially engaged by a substantial portion of the cutting edge 28 of the tine 25 and insures smooth initial entry of the tine 25 into the soil to be cultivated. The smooth entry of a tine 25 into the soil is further aided by forming the outer edge 29 of each tine 25 so that the outer edge 29 is substantially parallel to the direction of linear motion of the rotary hoe 10 when the rotary hoe 10 is positioned as described above. This prevents the outer edge 29 of each tine 25 from interfering with the smooth entry of the tine 25 into the soil.

After initial entry of the cutting edge 28 of a tine 25 into the soil, the rotary hoe 10 continues its linear motion and its rotation about the axis of rotation of the central hub 20. As a result, the cutting edge 28 of the tine 25 cuts deeper into the soil to be cultivated and in a direction transverse to the direction of linear motion of the rotary hoe 10. This motion of the tine 25 as it cuts deeper into the soil to be cultivated causes the working surface 30 of the tine 25 to move the soil both upwardly and laterally in a direction transverse to the direction of linear motion of the rotary hoe 10 and opposite to the direction of rotation of the rotary hoe 10. The upward motion of soil decreases and the lateral motion of the soil continues as the tine 25 rotates upwardly to be disengaged from the soil being cultivated. The result of the upward and lateral motion of soil by each of the plurality of tines 25 of the rotary hoe 10 is the thorough turning and agitation of a ribbon of soil having substantial width transverse to the direction of linear motion of the rotary hoe 10.

As each of the plurality of tines 25 is withdrawn from the soil being cultivated, pieces of soil clinging to the working surface 30 are dropped substantially downward from the tine 25. This is because each tine 25 is curved downwardly as the tine 25 is withdrawn from the soil being cultivated and soil clinging to the working surface 30 of the tine 25 tends to drop downwardly from the tine 25. Thus, even though the rotary hoe 10 disclosed herein results in substantial working of soil because of both upward and lateral motion of the soil, the worked soil drops smoothly from the rotary hoe 10 so as to prevent the rotary hoe 10 from becoming clogged with soil.

The rotary hoe 10 disclosed herein is conveniently used as one of a plurality of similar rotary hoes 10 assembled to form a gang G of rotary hoes 10. The plurality of rotary hoes 10 assembled into a gang G are identical and all of the plurality of rotary hoes 10 are positioned on a single axle 42. The rotary hoes 10 are fixedly positioned on the axle 42 with respect to each other and the axle 42 by extending a plurality of grooves 13 along the inner surface of the channel 47 through the central hub 20 of each of the plurality of rotary hoes 10 and by engaging the grooves 46 with similar grooves (not shown) along the length of the axle 42.

The axle 42 rotatably extends between and through the arms 43 and 44 of a fork 45 and nuts 73 engage the extending ends of the axle 42. The upper ends of the arms 43 and 44 of the fork 45 are joined by a horizontal member 46 and the horizontal member 46 is attached by a clamp 47 to a pipe 48 extending from the main frame 49 of a rotary cultivator (not shown). The clamp 47 is of a known type which permits pivotable motion of the fork 45 relative to the pipe 48 and having a slot 49 through which a bolt 50 extends to allow the fork 45 to be fixedly positioned in known manner at any of a plurality of angles with respect to the pipe 48.

It will now be understood that when the gang G is positioned on the pipe 48 with the axle 42 at an angle to the direction of linear motion 51 of the main frame 49 which places each of the plurality or rotary hoes 10 forming the gang G in that position in which the cutting edges 28 of the tines 25 initially engage the soil, each of the plurality of rotary hoes 10 in the gang G will work the soil in the manner described above. Moreover, the soil worked by one rotary hoe will overlap the soil worked by adjacent rotary hoes 10 and the result will be an even more efficient and substantial working of a ribbon of soil.

The rotary hoe 10 disclosed herein tends to twist about a vertical axis which intersects the axis of rotation of the central hub 20 because the tines 25 of the rotary hoe 10 are engaging and cutting deeply into the soil on only one side of this vertical axis. Thus, when the rotary hoe 10 disclosed herein is used alone or with a plurality of similar rotary hoes 10 assembled into a gang G there is a tendency for the rotary hoe 10 to twist about a vertical axis toward a position in which the working side W of the rotary hoe 10 is in a plane perpendicular to the direction of linear motion 51 of the rotary hoe 10. This tendency of the rotary hoe 10 to twist about a vertical axis causes a twisting stress to be placed upon the main frame 49 of a rotary cultivator (not shown).

Figure 3:
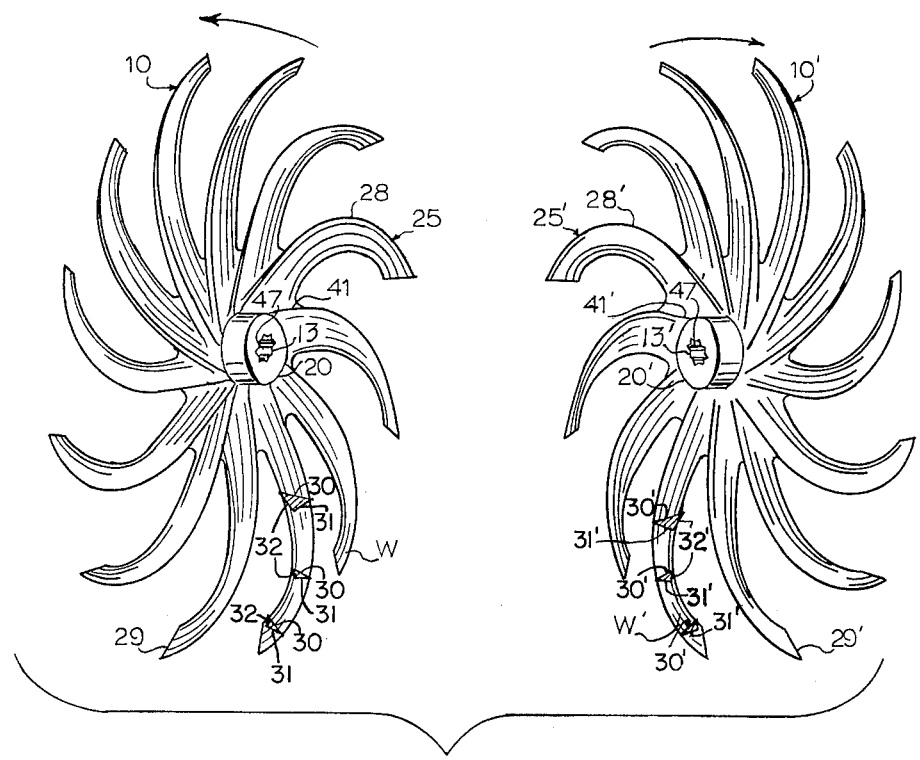
FIG. 3 is a perspective view of the embodiment of the rotary hoe shown in FIG. 1 and of a second embodiment of the rotary hoe disclosed herein in which the tines are arranged to provide a working side on the opposite side of the rotary hoe from that on which the working side is provided by the first embodiment of the rotary hoe shown in FIG. 1.

However, this twisting stress on the main frame 49 of a rotary cultivator (not shown) can be easily avoided by using the rotary hoe 10′ shown in FIG. 3 in combination with the rotary hoe 10. The rotary hoe 10′ is the mirror image of the rotary hoe 10 and as a result the tines 25′ of the rotary hoe 10′ place the working surface W′ of the rotary hoe 10′ opposite the working surface W of the rotary hoe 10 when the rotary hoe 10′ is positioned beside the rotary hoe 10 as shown in FIG. 3. Thus, when the rotary hoe 10′ is used alone or with a plurality of other rotary hoes 10′ assembled to form a gang G′, the rotary hoe 10′ must be positioned at an angle to a direction of linear motion 51 which is in the opposite direction from the angle of the rotary hoe 10′. The result is that the rotary hoe 10′ or a gang G′ of rotary hoes 10′ tends to twist in the opposite direction about a vertical axis from the rotary hoe 10 or a gang G. The opposite tendencies to twist of the rotary hoe 10 and the rotary hoe 10′ eliminate twisting stress on the main frame 49 of a rotary cultivator (not shown) when the rotary hoe 10 and rotary hoe 10′ are properly positioned such as at opposite ends of the main frame 49.

From the foregoing it will be understood that whether used alone or in a gang G, the rotary hoe 10 disclosed herein accomplishes the thorough and efficient working of soil. This is because regardless of the embodiment of the rotary hoe 10, the tine 25 construction results in each tine 25 sliding easily into the soil to be cultivated and in each tine 25 imparting substantial motion to the soil being cultivated without substantial use of power simply to force the tine 25 into the soil.

It will be obvious to those skilled in the art that many variations may be made in the embodiments chosen for the purpose of illustrating the present invention without departing from the scope thereof as defined by the appended claims.

What is claimed as invention is:

1. A rotary hoe of the type to be arranged with a gang of hoes having its axis of rotation disposed at an angle other than 90 degrees with respect to the direction of the normal movement of the gang of hoes over the soil and having a plurality of radially arcuate tines designed to penetrate the soil and move therethrough in a direction generally transverse to the movement of the gang over the soil; the improvement therein of each of said tines being triangular in cross section and having a working surface and a second surface which converge together at an acute angle to form a convex cutting edge and wherein said working surface is disposed at an acute angle with respect to the soil at any point along its line of contact therewith and said second surface is disposed at a lesser acute angle with respect to the soil, whereby during the travel of each of the tines through the soil the cutting edge severs a portion of the soil and the working surface wedges the severed portion of the soil upwardly.

2. A rotary hoe of the type described in claim 1 wherein said working surface and said second surface of each of said tines are of substantially constant width throughout substantially their entire length, and each of said tines increases in thickness from its tip inward toward its axis of rotation.

3. A rotary hoe of the type to be arranged with a gang of hoes with their axes of rotation disposed at an angle other than 90 degrees with respect to the direction of normal movement of the gang of hoes through the soil and having a plurality of radially arcuate tines designed to penetrate the soil; the improvement therein of each of said tines having a portion thereof constructed in the shape of a triangular wedge with a substantially sharp edge extending in a plane disposed perpendicular to said axis of rotation of said hoe, each of said tines increasing in thickness from its tip inward and being constructed to have a working surface and a second surface which converge together at an acute ange to form a convex cutting edge and wherein said working surface is disposed at an acute angle which is greater than said first mentioned acute angle with reference to the soil at any point along its line of contact with the soil, whereby during the travel of each of the tines through the soil the cutting edge severs a portion of the soil and the working surface wedges the severed portion of the soil upwardly.

4. A rotary hoe of the type to be utilized with a gang of hoes having its axis of rotation disposed at an angle other than at 90 degrees with respect to the direction of movement of the gang of hoes over the soil and having a plurality of tines arranged to penetrate the soil and move therethrough in a direction generally transverse to the movement of the gang over the soil; the improvement therein of each of said tines being triangular in cross section and having a working surface and a second surface converging together to form a cutting edge which is oriented toward the transverse movement of the tine through the soil, and wherein said working surface is disposed at an acute angle with respect to the soil at any point along its line of contact therewith and said second surface is disposed at a lesser acute angle with respect to the soil, whereby during the travel of each of the tines through the soil the cutting edge severs a portion of the soil and the working surface wedges the severed portion of the soil upwardly.

5. A rotary hoe of the type to be arranged with a gang of hoes with their axes of rotation disposed at an angle other than 90 degrees with respect to the direction of normal movement of the gang of hoes through the soil and having a plurality of radially arcuate tines designed to penetrate the soil; the improvement therein of each of said tines having a portion thereof constructed in the shape of a wedge with a substantially sharp edge extending in a plane disposed perpendicular to said axis of rotation of said hoe, each of said tines increasing in thickness from its tip inward and being constructed to have a transversely planar working surface and a second transversely planar surface which converge together at an acute angle to form a convex cutting edge for engagement with the soil and wherein said working surface is disposed at an acute angle which is greater than said first mentioned angle with reference to the soil at any point along its line of contact with the soil, whereby during the travel of each of the tines through the soil the cutting edge severs a portion of the soil and the working surface wedges the severed portion of the soil upwardly.

References Cited by the Examiner

UNITED STATES PATENTS

| 957,772 | 5/1910 | Walker | 172—549 X |
| 1,288,608 | 12/1918 | Johnson | 172—554 X |
| 1,387,725 | 8/1921 | Johnson | 172—540 |
| 3,107,737 | 8/1963 | Van Sickle et al. | 172—595 X |

FOREIGN PATENTS 119,562  10/1918  Great Britain.

ABRAHAM G. STONE, *Primary Examiner.*

T. GRAHAM CRAVER, *Examiner.*